April 23, 1968  B. W. REITER ET AL  3,379,142
BAGEL-MAKING APPARATUS
Filed Sept. 12, 1966

INVENTORS
BERNARD W. REITER
KARL EINSTEIN
BY
Paul Maleson
ATTORNEY

United States Patent Office 3,379,142
Patented Apr. 23, 1968

3,379,142
BAGEL-MAKING APPARATUS
Bernard W. Reiter, 1091 City Ave. 19151, and Karl Einstein, 6020 Alma St. 19149, both of Philadelphia, Pa.
Filed Sept. 12, 1966, Ser. No. 578,716
9 Claims. (Cl. 107—8)

ABSTRACT OF THE DISCLOSURE

An apparatus to mechanically form a bagel from uncooked lumps of dough. A pair of parallel opposed endless chains each carry moulds. A stationary mandrel extends between opposed moulds and stationary spacers also extend between opposed moulds. The dough is rolled around and along the mandrel by the movement of the opposed moulds. The mandrel has relaxation points along its length.

---

This invention relates to an apparatus specifically intended to form dough into an uncooked pastry of the type which when cooked is known as a bagel. More particularly, it relates to a machine which receives lumps of dough and automatically forms each lump successively into the toroidal shape of an uncooked bagel by rolling the dough around and along a mandrel.

A great majority of bagels are presently primarily handmade or made with the aid of simple appliances or tools. Various machines and apparatus for the automatic forming of the bagel shape have been known but have all had shortcomings of one type or another.

Bagel shapes are made from a dough that is particularly tough and elastic and the forming of an acceptable bagel shape from such dough presents certain problems. This machine has means to specifically deal with these problems. For example, the bagel dough during its handling in the machine should not be sheared or torn as this damages its quality. Previously known machines tend to do this. As much as possible of the forming action should be a continuous rolling of the dough until the closed loop is formed, and the loop once formed or partially formed should not be again broken. To interrupt or break the loop after it has been wholly or partially formed increases the chances that the final produced bagel shape will have a complete or partial discontinuity which is undesirable. Some previously known machines do break the loop during the manufacture.

Further, it is desirable in obtaining high quality bagels that there be a relaxation period during the forming of the dough into the desired shape. This machine provides for such relaxation stages in the process of formation, unlike other previously known machines which do not. Further, it is desirable that the handling of the dough be such that there is a minimum tendency for bits of dough to be trapped and left in parts of the machine. This is an important sanitary consideration, and previously known machines have more tendency to entrap such particles. The avoidance of shredding and tearing, and the provision of relaxation periods are part of the desirable condition that the dough be handled as gently as possible during its formation into the bagel shape. This machine handles the dough in this desirable manner to a greater degree than previously known machines. This machine is less prone to certain stress failures than some other known devices.

It is an object of this invention to provide an apparatus for the manufacture of a bagel-shaped piece of dough from a lump of dough.

It is an object of this invention to provide an apparatus to form a lump of dough into a bagel shape by principally a rolling action, with a minimum of rough handling or tearing or shredding of the dough and without interruption or breaking of the dough as partially or wholly formed into the bagel shape, and to provide relaxation periods during the forming of the bagel shape.

It is another object of this invention to provide means for successively automatically forming a plurality of dough lumps into bagel shapes.

It is another object of this invention to provide a simple reliable means for rolling a lump of dough around a mandrel to form said lump into a toroid or bagel shape.

It is another object of this invention to provide a mandrel provided with a reduced portion therealong to permit relaxation of the dough during the bagel shape forming step.

Other aims and objects of this invention are made apparent in the following specification and claims.

The invention is best understood with the accompanying drawings in which like reference numerals refer to like parts and in which.

Figure 1:
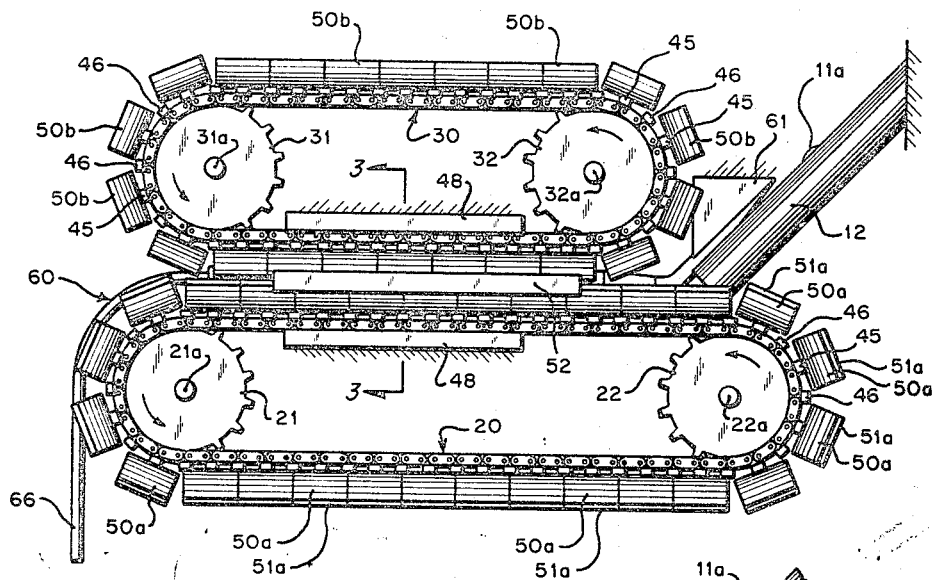
FIGURE 1 is a side elevation view of the bagel making apparatus.

The general structure and operation of the apparatus is best understood in connection with FIGURE 1. In general, the machine comprises two coacting endless horizontal link chains, one above the other, and each of them driven. It is understood that this pair of endless link chains, as clearly shown in FIGURE 1, are mounted and driven in an entirely conventional manner. That is, each of the endless chains has a wheel, pulley or sprocket wheel at each end thereof over which the chain runs. One or both of each of these wheels is driven directly or indirectly by a motor or other source of rotational power. Each of the wheels is journaled in suitable conventional bearings. Any conventional means and method can be used to apply the rotational power. Thus, there can be a single electric motor driving the belts through a series of belts and pulleys or chains and sprockets. There can be a number of motors separately driving one or more of the endless link chain wheels. The motor or motors can be directly coupled or indirectly coupled, as through a gear train. There may or may not be speed adjustment devices of known types used. The structure is of course mounted and held in a suitable framework and on a suitable base. Nothing patentable is claimed in any of the means or method of mounting the essential parts of the apparatus as shown and described and it is understood that any well-known conventional expedients may be utilized. The use of an endless belt or endless link chain in this art and other arts is well-known, and the invention herein lies in certain details of construction which are shown and described herein.

For purposes of ease of description, the uncooked bagel shaped piece of dough that emerges from the machine is referred to as a bagel, even though it is of course recognized that it is of raw dough at this stage and must be cooked.

Referring to FIGURE 1, the lower endless link chain is generally designated 20 and the upper endless link chain is generally designated 30. For ease of reference, the endless link chains are sometimes herein simply called chains. The lower chain 20 runs over the pair of sprocket wheels 21 and 22 at each end thereof respectively. Sprocket wheel 21 is mounted on shaft 21a and sprocket wheel 22 is mounted on shaft 22a. The upper chain 30 in a similar manner runs over the pair of sprocket wheels 31 and 32 at each end thereof respectively. Sprocket wheel 31 is mounted on shaft 31a and sprocket wheel 32 is mounted on shaft 32a. The sprockets on the sprocket wheels of course engage the chains and support and drive them. The sprocket wheels rotate during operation in the direction indicated by the arrows thereon. On each of the chains 20 and 30, rotational power can be applied to one of the sprocket wheel shafts with the other sprocket wheel acting as an idler, or both sprocket wheels on each chain can be driven. It is preferable if economics permit it to drive both sprocket wheels to minimize structural stress. It is preferable to have both chains driven from the same primary power source so that their speeds are maintained exactly identical, which is necessary.

The upper chain 30 is shorter then the lower chain 20. The lowermost portion of the upper belt 30 and the upper-most portion of the lower belt 20 oppose each other and are arranged in a parallel disposition spaced apart so that the hereinafter described structures which these chains bear coact as set forth below.

Between the opposed faces of the belts 20 and 30, a mandrel 60 is provided. The mandrel is described in more detail below.

It is important that the center of one sprocket wheel of the upper chain 30 be positioned inwardly of a vertical through the center of the sprocket wheel at the same end of lower belt 20. This condition is shown at the right side of FIGURE 1. This arrangement provides room for an inclined dough feed chute 12. In general, a pre-formed lump of dough 11a rolls or slides down chute 12 at the righthand end of the mandrel 60. Means to measure, pre-form and supply the dough lumps 11a to the top of chute 12 do not form a part of this invention. Separate apparatus is provided, although it is understood that it would be possible but hardly desirable to perform the functions of measuring, pre-forming and delivering dough lumps 11a in proper time sequence to the chute 12 by hand. The dough lump 11a initially lands from the chute on structure, described below, carried on lower chain 20. It is thence carried further into the apparatus, from right to left as shown in FIGURE 1, and engages mandrel 60 and structure, described below, carried on upper chain 30. It emerges as a shaped bagel (uncooked) at the left end as shown in FIGURE 1.

Figure 2:
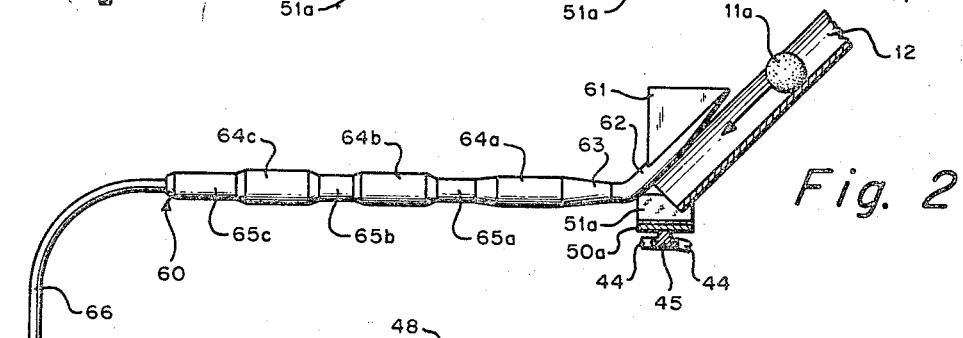
FIGURE 2 is a side elevation view, partly cross-section, of the mandrel and its closely associated structure.

The construction of the mandrel 60 is best shown in FIGURE 2. The major portion of mandrel 60 is horizontal. It is supported at one end by a bracket 61. Bracket 61 is firmly affixed to the mandrel 60 at the righthand end thereof as shown in FIGURES 1 and 2. The mandrel is preferably of metal, such as steel, and the bracket 61 is preferably welded to the mandrel or otherwise very firmly affixed to it. The bracket 61 is a fin-like upward extension starting at the righthand end of the mandrel and extending a short way along it. As best shown in FIGURE 1, the upper portion of bracket 61 is affixed to the frame of the machine. As shown in FIGURE 1, a series of like diagonal lines indicates in general a portion of the fixed framework of the machine, it being understood that this framework can be in any convenient form, such as bolted or riveted structural steel as an example. No patentable significance lies in the framework.

Returning to FIGURE 2, it is seen that the righthand extreme portion of mandrel 61 extends upward at an angle, and is preferably tapered from the narrow dimension at the right to a wider dimension as it progresses downwardly, as shown. Section 62 may be termed a sloped initial portion and is preferably inclined at an angle of 45° from the horizontal. Its vertical dimension upward from the horizontal may be preferably seven and one-half (7½) inches in a typical apparatus.

The mandrel then enters its horizontal section. A horizontal initial portion 63 increases its diameter to first forming portion 64a. The diameter of the mandrel is then gradually reduced to the first relaxation portions 65a. It then gains in diameter to second forming portion 64b. Thence, it reduces gradually to second relief portion 65b. The mandrel 60 then gradually increases to final forming portion 64c. This then reduces to final relief portion 65c. Typically, horizontal initial portion 63 may start at a diameter of one and one half (1½) inches and increase over a length of three (3) inches to a diameter of two (2) inches. Each of the forming portions may extend horizontally four (4) inches. The first relaxation portion 65a may have a diameter of one and three quarter (1¾) inches. The second forming portion 64b may have a diameter of two and one quarter (2¼) inches. The second relaxation portion 65b may extend horizontally three (3) inches and have a diameter of two (2) inches. The final forming portion 64c may have a diameter of two and one half (2½) inches, and the final relaxation portion may have a diameter of two and one sixteenth (2¹⁄₁₆) inches and a horizontal length of four and one half (4½) inches. It is understood that these dimensions have been found to be suitable and preferable for the production of bagels of standard sizes, but departures may be made from the exact dimensional relationships without departing from the scope of the invention if the same function is obtained thereby.

The points at which the diameter of the mandrel 60 change are preferably somewhat smooth and rounded rather than being left with sharp edges. The surface of the mandrel is otherwise smooth and unridged. At the lefthand end of the mandrel, an exit guide 66 is provided. This has no forming function, and its diameter is smaller than the aperture of the bagel. The bagel simply is pushed or slides along it and falls off onto some receiving or conveying means which does not in itself form a part of this invention. The finished (uncooked) bagel 11c is shown as it falls off exit guide 66 in FIGURE 2. Exit guide 66 may be a metal rod, or may be a small diameter metal rod surrounded by a flexible plastic tube having a low coefficient of friction to facilitate the passage of the bagels.

The mandrel 60 is supported only at the righthand end thereof before the dough lump forms around the mandrel to the point of reaching the bracket 61. As best seen in FIGURE 2, the dough lump 11a contacts the mandrel initially at the bottom of the mandrel at or near that place where the sloped initial portion 62 changes to the horizontal initial portion 63. There is no piercing or impaling of the dough by the mandrel. The mandrel is cantilevered from its support 61.

Lower chain 20 has attached to the length thereof a plurality of lower moulds 50a and upper chain 30 has attached to the length thereof a plurality of upper moulds 50b. On each chain, these moulds are arranged successively along the length of the chain so that on the horizontal portions thereof, the moulds are in end to end abutting relationship. Each of the moulds 50a and 50b is a segment of a cylinder having a transverse cross-section being a circular arc of less than semi-circular extent. When each of these moulds is fastened to a link of its respective chain, the general disposition of the moulds 50a and 50b with respect to their chains and to each other is best shown in FIGURE 1. The chains 20 and 30 are so spaced that along the horizontal opposed portions of these chains, the respective moulds 50a and 50b closely approach each other but do not touch. The extent of the approach and the reasons therefor are explained below. The registration of the upper and lower moulds with respect to each other along a horizontal path is staggered. That is, a given lower mould 50a opposes one half each of two abutting upper moulds 50b, as clearly shown in FIGURE 1. There are two reasons for this. One reason is to help prevent any inadvertent leakage of the dough during the forming step by staggering openings.

The other reason is explained with reference to the general operation and structure of the apparatus. As the moulds begin to diverge from each other at the left end of FIGURE 1 it is seen that the trailing edge of each upper mould dips downwardly and the trailing edge of each lower mould dips upwardly. It is necessary to prevent these edges from interfering with and binding on one another. The same thing is true, except that the leading edges are involved, at the righthand end of FIGURE 1, where the moulds approach each other. Two main structural provisions are made to provide the necessary clearance. One of these provisions is the staggered relationship of the upper and lower moulds as has been described, so that the dip or rise of the trailing or leading edge tends to come into the opening space between the opposed moulds. Another provision to prevent binding is the above-stated fact that each of the moulds has a transverse section of less than a semi-circle and the opposed upper and lower moulds do not physically bear against one another. This provides some further clearance. Even further clearance is automatically provided at the righthand end by the offset of the righthand sprocket wheels of the upper and lower chains as has been described. Preferably, a similar offset can be made at the lefthand end, as shown in FIGURE 1, to gain an advantage at the exit end also. The advantage lies in the fact that both the upper and lower moulds are not having their maximum deviation from their normal horizontal path at the same moment in their travel. This structure permits the use of simple un-hinged moulds with sanitary, maintenance, economic and other advantages stemming therefrom. In particular, the provision of a structure without hinged sections acting on the dough is highly advantageous, since the type of dough used in making bagels is unusually tough and produces a good deal of resistance to shaping, and has been found to be capable of shearing off or otherwise damaging hinges on machines using such expedients.

The construction, mounting, and operation of a typical opposed pair of moulds and associated structure is best described in connection with FIGURE 3. A lower mould 50a is shown in end view. An upper mold 50b is shown in a transverse cross-section in its position opposed to the lower mould as has been described. The staggered relationship of the upper and lower moulds is described above and is best shown in FIGURE 1. The mandrel 60 is shown in cross-section, being positioned between the upper and lower moulds.

Figure 3:
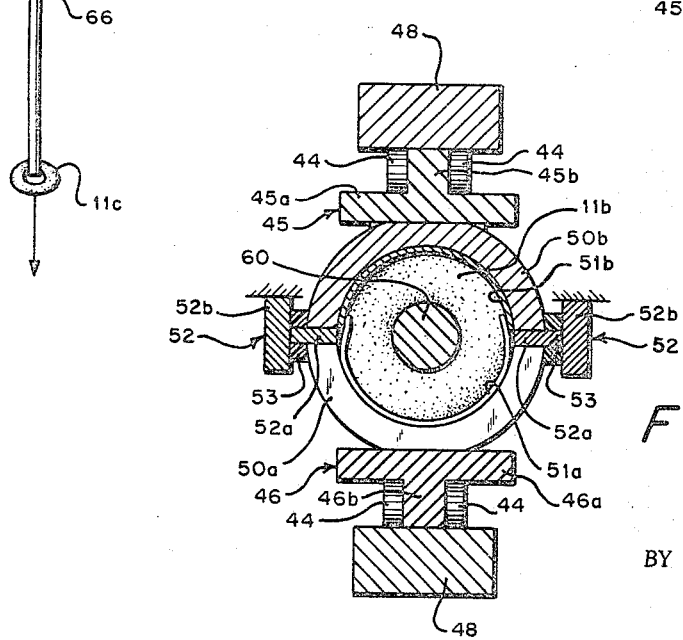
FIGURE 3 is a cross-sectional view, taken along line 3—3 of FIGURE 1.

FIGURE 3 shows that the upper and lower moulds do not meet. As described above, each of these moulds is in the shape of a circular arc but less than a semi-circle, that is, less than 180°. It is desired that the bagel 11b shown in FIGURE 3 around the mandrel inside the moulds, have a circular shape. Thus, the remaining portions of a full circle arc must be provided for by means other than the upper and the lower moulds. These means are inserts 52a. Each of the inserts 52a are mounted on a backing bar 52b. At each side as shown FIGURE 3, an insert 52a extends between the opposed edges of the upper and lower moulds and terminates at the inner surfaces of these moulds. The thickness and the shape of each of the inserts is such that a full continuous 360° circular shape is defined by the inside surfaces of the upper and lower moulds and the inside surfaces of the inserts. It has been found that a suitable thickness for each of the inserts 52a is approximately one quarter of an inch when making doughnuts of normal size. The reasons for having this gap at each side of the opposed moulds is explained above. As explained, the dough while being formed exerts a very considerable and surprising pressure and stress. Therefore, the inserts 52a are mounted on the backing bars 52b which are in turn firmly affixed in any convenient way to the framework of the machine. Each backing bar-insert assembly is generally designated 52. The backing bar-insert assembly remains stationary with respect to the mandrel, since both it and the mandrel are mounted on the machine framework. The inserts 52a are preferably made of a plastic having a relatively low coefficient to friction. Nylon has been found satisfactory. Gaskets 53 may be provided on the backing bar-insert assemblies.

To obtain the highly desirable rolling motion of the lump of dough around the mandrel, the following provision on the internal walls of the inserts and the moulds has been found satisfactory and preferable. The upper mould 50b is provided with an internal surface or liner 51b of low friction coefficient plastic. The plastic known as Teflon has been found satisfactory. The lower mould 50a has its internal surface provided with a liner 51a which is preferably of canvas. In general, the liner 51a can be said to have the requirements of being flexible and of having a relatively high coefficient of friction against the dough. The canvas liner 51a extends beyond the edges of the lower mould 50a as shown in FIGURE 3, a distance sufficient to cover the gap between the upper and lower moulds which is filled by the inserts 52a. A loose flap or extension of the canvas liner is provided to accomplish this. The purpose is to prevent leakage of dough under high pressure into the cracks between the moulds and the inserts. Because of the surprising pressures and mechanical stresses created during the forming operation, it has been found that there is a tendency for such seepage or leakage to occur even where there are close fits and tolerances. It is neither necessary or desirable to extend the lower mould liner 51a substantially beyond the gap as described.

Each mould is attached to its associated endless link chain. Upper mould 50b is attached to a link 44 of the upper link chain by attaching means 45. Lower mould 50a is attached to a link 44 of the lower link chain by attaching means 46. The attaching means 45 comprises a base section firmly affixed to a flattened portion on the outer surface of upper mould 50b, as shown. And a leg portion 45b which is affixed to the link 44. Typically, the chain in an endless link chain consists of a plurality of side pieces, such as shown at 44 in FIGURE 3, and a series of transverse connecting bars, pins, or pieces which hold the pair of side pieces in spaced apart relationship. In FIGURE 3, the leg portion 45b of the attaching means 45 is shown fastened to one of the chain transverse pieces which is in itself not shown. The leg portion 46b of the attaching means 46 is similarly attached. It is understood that the exact attaching means is not in itself critical. Thus, the transverse piece of a chain may pass through a hole in a leg portion 45b or 46b, or the attaching means may be welded to such a piece.

It has been found necessary to prevent pressure created by the dough from forcing the moulds apart to provide guide bars 48. One guide bar 48 is provided for the upper mould and a guide bar 48 is provided for the lower mould. The guide bars are firmly affixed to the machine framework, as best shown in FIGURE 1. It is preferable that at least a portion of the attaching means be extended so that it bears against the guide bar 48 rather than have links of the chain itself bear against the guide bar. It is understood that there are obvious possible mechanical variations available.

The guide bars 48 and the backing bars 52b must extend at least as far along the mandrel 60 as there is substantial pressure being exerted. FIGURE 1 shows the guide bars 48 and one of the backing bars 52b extending a major portion of the horizontal travel of the lower portion of the upper chain 30. It is understood that these bars must extend horizontally at least to cover the initial and final forming portions of the mandrel.

A dough lump 11a slides down the chute 12 in the direction of the arrow as shown in FIGURE 2 and strikes the canvas liner 51a of lower mould 50a. This figure also shows another view of the links 44 and the attaching means 45, showing the attaching means around the transverse link pins or pieces. The moving liner carries the dough into contact with the lower portion of the mandrel 60 as has been described and then, as best shown in FIGURE 1, the upper mould comes down and starts to enclose the dough lump between the mandrel and the upper and lower moulds and the inserts. The canvas liner carries the dough along and starts to roll it around the mandrel. It is found that the combination of the canvas and the Teflon provides a desirable rolling forming motion and produces a good smooth-surfaced bagel. The dough is not formed into a completed and rolled bagel at once; the various forming portions 64a, 64b and 64c each contribute to roll the completely continuous and smooth bagel 11b. The bagel is finally discharged at the left end, as shown at 11c in FIGURE 2 and as has been described.

The essential and critical portions of the apparatus have been shown and described. It may be found desirable to provide means near the righthand end of the machine to guide and control the flaps of the canvas liner 51a. Thus, spreaders could be provided to initially keep the flaps apart. Other spreaders can then be provided to bend them inwardly as the upper and lower mould sections approach each other, but where the flap is short, as shown in FIGURE 3, the necessity or desirability of such devices is removed.

The lower chain and its moulds may be called the first chain and first moulds respectively, and the upper chain and its moulds may be called the second chain and second moulds respectively. Broadly, the described link-chain is a type of endless belt.

The scope of this invention is to be determined by the appended claims and is not to be limited to the foregoing description and drawings which are illustrative.

We claim:

1. Apparatus for forming a lump of bagel dough into an uncooked bagel, comprising;
    an elongated mandrel supported only at one end thereof,
    a moveable first endless chain having at least one straight section and a plurality of first moulds on said chain,
    a moveable second endless chain having at least one straight section and a plurality of second moulds on said second chain,
    each of said first and second moulds comprising a segment of a cylinder having a cross-section transverse to said chain of a circular arc of less than semi-circular extent and terminating in edges,
    said straight sections of said first and second chains opposing each other in a parallel spaced relationship, said first moulds on said section being spaced apart from said second moulds on said second chain straight section,
    a pair of elongated inserts, fixed with respect to said mandrel, extending between said opposed first and second moulds where said edges of said first and second moulds are spaced apart,
    said mandrel being positioned between said opposed first and second moulds.

2. Apparatus as set forth in claim 1 wherein each of said first moulds is disposed in abutting end to end relationship with adjacent first moulds on said straight section and each of said second moulds is disposed in abutting end to end relationship with adjacent second moulds on said second straight section.

3. Apparatus as set forth in claim 2 wherein said first moulds on said first chain straight section are opposed in a staggered relationship to said second moulds on said second chain straight section, the ends of each said first mould being displaced from the ends of the nearest opposing second moulds, and said first and second moulds are moveable at the same rate along said straight sections of said chains.

4. Apparatus as set forth in claim 3 wherein said straight section of said first chain extends further in one direction than said straight section of said second chain.

5. Apparatus as set forth in claim 3 wherein said straight section of said first chain extends further in both directions than said straight section of said second chain.

6. Apparatus as set forth in claim 3 wherein a pair of guide bars are provided extending in the direction of said chain straight sections and fixed with respect to said mandrel, one of said guide bars slidably engaging said first moulds on said straight section, said first moulds being positioned between said guide bar and said inserts, and the other of said guide bars slidably engaging said second moulds on said second straight section, said second moulds being positioned between said other guide bar and said inserts.

7. Apparatus as set forth in claim 3 wherein said mandrel has a circular cross-section and at least two forming portions therealong, a relaxation portion between said forming portions, said relaxation portion having a cross-section of reduced diameter relative to said forming portions, each successive forming portion along said mandrel in the direction in which said moulds are moveable having a greater cross-section diameter.

8. Apparatus as set forth in claim 3 wherein all of said moulds each have an inner surface and all the moulds of one of said first moulds and second moulds have said inner surface of a relatively low coefficient of friction with respect to said dough and smooth, and all the moulds of the other of said first moulds and second moulds having a liner, said liner being rough and having a relatively high coefficient of friction with respect to said dough, said liner having flexible portions extending beyond said mould a distance sufficient to cover said inserts but less than a major portion of said smooth inner surface.

9. A mandrel for use in bagel-making apparatus to have dough forced along and around it, said mandrel having a circular cross-section and at least two forming portions therealong, a relaxation portion between said forming portions, said relaxation portion having a cross-section of reduced diameter relative to said forming portions, each successive forming portion along said mandrel in the direction in which said dough is forced having a greater cross-section diameter than the preceding forming portion, said mandrel tapering between each said forming portion and each said relaxation portion.

References Cited

UNITED STATES PATENTS

| | | | |
|---|---|---|---|
| Re. 25,536 | 3/1964 | Thompson | 107—8 |
| 2,628,578 | 2/1953 | Roth | 107—54 |
| 3,247,808 | 4/1966 | Thompson | 107—54 |

WALTER A. SCHEEL, *Primary Examiner.*

J. SHEA, *Assistant Examiner.*